H. D. JAMES.
CONTROLLER.
APPLICATION FILED MAR. 2, 1910.

1,042,444.

Patented Oct. 29, 1912.

2 SHEETS—SHEET 1.

WITNESSES:
C. L. Belcher
Otto S. Schairer

INVENTOR
Henry D. James
BY
Wesley G. Carr
ATTORNEY

H. D. JAMES.
CONTROLLER.
APPLICATION FILED MAR. 2, 1910.

1,042,444.

Patented Oct. 29, 1912.

2 SHEETS—SHEET 2.

WITNESSES:
C. L. Belcher
Otto S. Schairer

INVENTOR
Henry D. James
BY
Wesley G. Carr
ATTORNEY

UNITED STATES PATENT OFFICE.

HENRY D. JAMES, OF PITTSBURGH, PENNSYLVANIA, ASSIGNOR TO WESTINGHOUSE ELECTRIC AND MANUFACTURING COMPANY, A CORPORATION OF PENNSYLVANIA.

CONTROLLER.

1,042,444.  Specification of Letters Patent.  Patented Oct. 29, 1912.

Application filed March 2, 1910. Serial No. 546,857.

*To all whom it may concern:*

Be it known that I, HENRY D. JAMES, a citizen of the United States, and a resident of Pittsburgh, in the county of Allegheny and State of Pennsylvania, have invented a new and useful Improvement in Controllers, of which the following is a specification.

My invention relates to electrical controlling devices, and it has for its object to provide a controller for regulating the direction and value of the drop of potential in an electrical circuit and by means of which the circuit is either interrupted or its resistance, or impedance, is increased, when there is no drop of potential in it, or when the said drop of potential attains a predetermined value.

In Patent No. 925,341, granted, June 15, 1909, to the Westinghouse Electric & Manufacturing Company, upon an application filed by me, is set forth a controller comprising two resistances that are connected in parallel to a supply circuit, and between intermediate points of which a distributing circuit is connected, and a movable member for shunting portions of the respective resistances. In the present instance, the said controller is employed for regulating the operation of a series motor, the armature of which is connected between intermediate points of the respective resistances, and the field magnet winding of which is connected in series with the resistances, and means are provided for either entirely disconnecting the field magnet winding from the supply circuit, or for connecting a resistance in series therewith, when there is no drop of potential in the motor armature, or when the armature is at rest.

Figure 1:
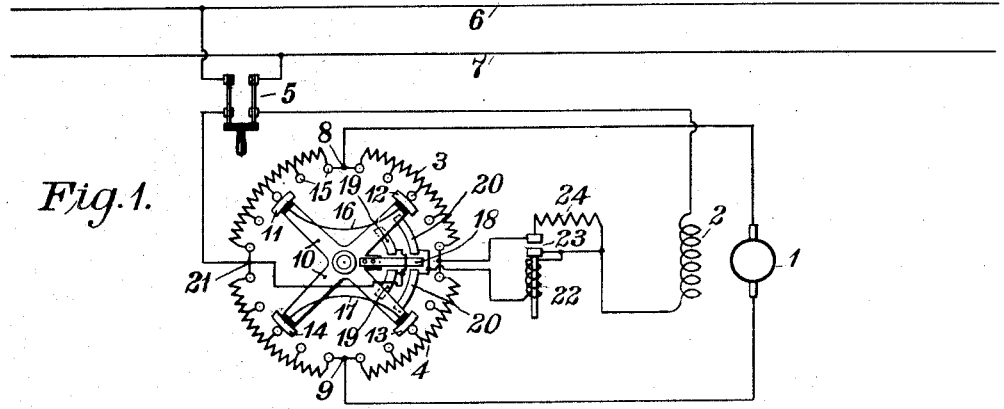
Figure 2:
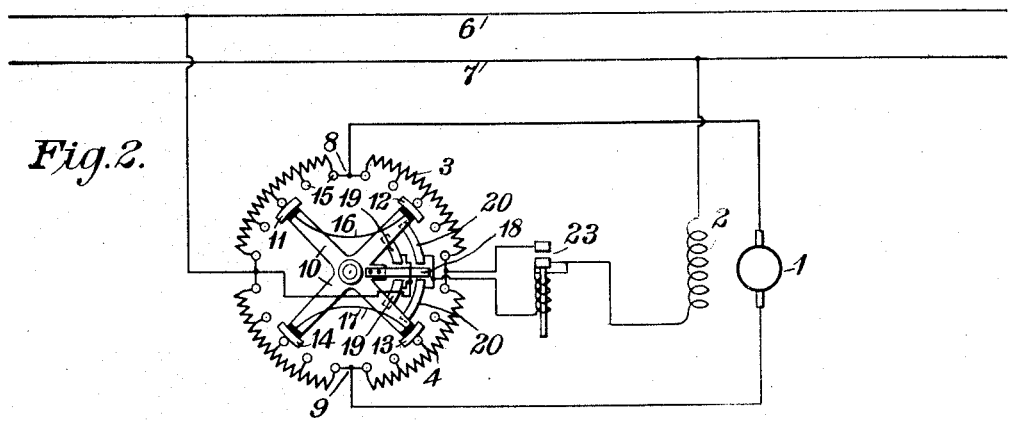
Figure 3:
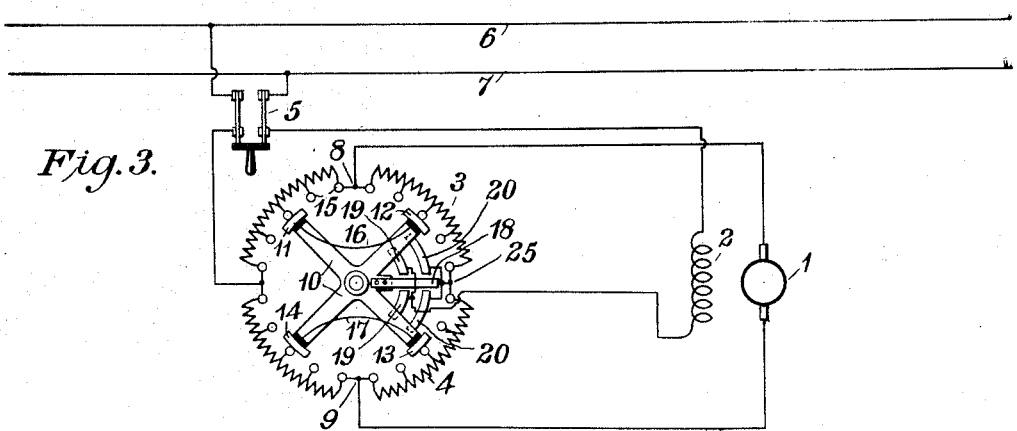
Figure 4:
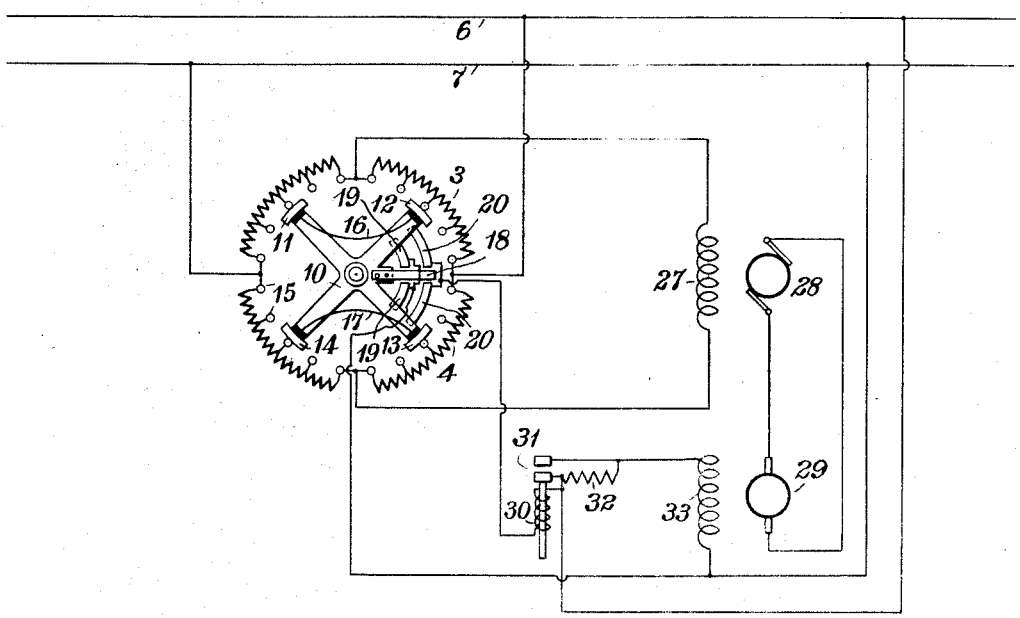

Figure 1 of the accompanying drawing is a diagrammatic view of a system embodying the present invention, and Figs. 2, 3 and 4 are similar views of systems that embody modifications of the invention.

In each of the figures, a motor, comprising an armature 1 and a series field magnet winding 2, is regulated in its operation by means of a controller comprising two subdivided resistances 3 and 4 that are connected in parallel relation, by means of a switch 5, to a suitable supply circuit 6—7, the motor armature 1 being connected between intermediate points 8 and 9 of the respective resistances, and the field magnet winding 2 being connected in series with the said resistances. The controller comprises, further, a rotatable member 10 having four radial arms, disposed approximately at right angles to each other, upon the extremities of which are mounted brushes 11, 12, 13 and 14 that are adapted to engage contact terminals 15 to which the points of subdivision of the resistances are connected. The brushes 11 and 12 are connected together by means of a conductor 16, and the brushes 13 and 14 are similarly connected together by means of a conductor 17, so that, as the member 10 is rotated, different portions of the resistances 3 and 4 will be shunted, with the result that the difference of potential between the points 8 and 9 of the resistances, to which the armature is connected, will be dependent in value upon the extent of movement of the member 10 from the position shown, and its direction, as well as the direction of rotation of the motor armature, will depend upon the direction of rotation of said member. The movable member 10 carries another brush 18 that is adapted to engage two sets of stationary conducting ring segments 19 and 20 only when it is rotated in either direction from the position shown, so as to cause a difference of potential between the points 8 and 9. The segments 19 are connected to terminal 21 of the resistance 3 and 4, and the segments 20 are connected to an operating or controlling magnet winding 22 of a switch 23 that is interposed in the connection between the resistances 3 and 4 and the series field magnet winding 2, the other terminal of the winding 22 being connected to one terminal of the field magnet winding 2. The parts 18, 19 and 20, therefore, serve to control the circuit of the magnet winding 22, and, consequently, also, the operation of the switch 23, and in such a manner that the said switch remains open so as to disconnect the series field magnet winding 2 and the resistances from the supply circuit, when the movable member 10 of the controller occupies the position shown, that is, when there is normally no difference of potential between the motor armature terminals, and the armature is at rest.

In Fig. 1, a resistance 24 is connected between the terminals of the switch 23, so that, when the switch is open, it is included in circuit with the resistances 3 and 4 and the field magnet winding 2. The resistance 24 thus reduces the amount of current that traverses the said parts, when the armature is at rest, as well as the heating thereof and the losses therein.

In Fig. 2, the resistance 24 is omitted, so that, when the movable member 10 occupies the position shown, the circuit which includes the field magnet winding 2 and the resistances 3 and 4 is interrupted.

Instead of employing the switch 23 for governing the circuit which includes the field magnet winding 2 and the resistances 3 and 4, the parts 18, 19 and 20 may be utilized directly for that purpose, as illustrated in Fig. 3, in which the segments 19 are connected to one terminal of the field magnet winding 2 and the segments 20 are connected to terminal 25 of the resistances 3 and 4.

In Fig. 3, the circuit which includes the field magnet winding 2 and the resistances 3 and 4 is interrupted when the movable member 10 of the controller occupies the position shown, but, if desired, a resistance may be connected between the segments 19 and 20, in order to secure the same results as are secured in the system of Fig. 1.

In Fig. 4, the controller or rheostat is employed to regulate the field 27 of a generator, the armature 28 of which supplies current to the armature 29 of a motor. The parts 18, 19 and 20 govern the circuit of an operating or controlling magnet winding 30 of a switch 31 that is adapted to shunt a resistance 32 in the circuit of field magnet winding 33 of the motor, or that may be employed for opening and closing the said circuit. The arrangement is such, of course, that the resistance 32 is not shunted, and is, therefore, included in circuit with the motor field magnet winding 33, or, if the resistance 32 is omitted, the circuit of the motor field magnet winding is interrupted, when no difference of potential is applied to the generator field magnet winding.

I claim as my invention:

1. The combination with a motor having two windings, of a controller therefor comprising two parallel-connected resistances between intermediate points of which one of the motor windings is connected and in series with which the other motor winding is connected, means for regulating the difference of potential between the terminals of the winding that is connected to intermediate points of the resistances, and means for reducing the current in the other winding when the drop of potential attains a predetermined value.

2. The combination with a motor having an armature and a field magnet winding, of a controller therefor comprising two parallel-connected resistances between intermediate points of which the motor armature is connected and in series with which the motor field magnet winding is connected, means for regulating the difference of potential between the armature terminals, and means for reducing the current in the field magnet winding when there is substantially no drop of potential between the armature terminals.

3. The combination with a motor having two windings, of a controller therefor comprising two parallel-connected resistances between intermediate points of which one of the motor windings is connected and in series with which the other motor winding is connected, means for regulating the difference of potential between the terminals of the winding that is connected to intermediate points of the resistances, and means for reducing the current in the circuit of the other winding to a minimum value when the drop of potential is substantially zero.

4. The combination with a motor having an armature and a field magnet winding, of a controller therefor comprising two parallel-connected resistances between intermediate points of which the motor armature is connected and in series with which the motor field magnet winding is connected, means for regulating the difference of potential between the armature terminals, and means for interrupting the circuit of the field magnet winding when there is substantially no drop of potential between the armature terminals.

5. The combination with a motor having an armature and a field magnet winding, of a controller therefor comprising two parallel-connected resistances between intermediate points of which the motor armature is connected and in series with which the motor field magnet winding is connected, a movable member for regulating the effective values of the said resistances, and means for reducing the current in the field magnet winding when the said member occupies a predetermined position.

6. The combination with a motor having an armature and a field magnet winding, of a controller therefor comprising two parallel-connected resistances between intermediate points of which the motor armature is connected and in series with which the motor field magnet winding is connected, means for regulating the difference of potential between the armature terminals, a resistance, and means for including the same in circuit with the field magnet winding when there is substantially no drop of potential between the armature terminals.

7. The combination with a motor having an armature and a field magnet winding, of a controller therefor comprising two parallel-connected resistances between intermediate points of which the motor armature is connected and in series with which the motor field magnet winding is connected, a movable member for regulating the effective values of the said resistances, a switch for governing the circuit of the field magnet winding and having a controlling magnet winding the circuit of which is governed by the said movable member.

8. The combination with a translating device having a plurality of circuits, of two parallel-connected resistances between intermediate points of which one of the said circuits is connected, means for regulating the drop of potential in said circuit, and means for interrupting another circuit of said device when the said drop of potential is substantially zero.

9. The combination with a translating device having a plurality of circuits, of two parallel-connected resistances between intermediate points of which one of the said circuits is connected, means for regulating the drop of potential in said circuit, and means for reducing the current in another circuit of said device when the said drop of potential attains a predetermined value.

In testimony whereof, I have hereunto subscribed my name this 26th day of Feb., 1910.

HENRY D. JAMES.

Witnesses:
H. E. McWETHY,
B. B. HINES.